United States Patent
Kostrzewa et al.

(10) Patent No.: US 7,796,168 B1
(45) Date of Patent: Sep. 14, 2010

(54) METHODS AND SYSTEMS FOR DETECTION AND MITIGATION OF IMAGE-FLASH IN INFRARED CAMERAS

(75) Inventors: Joseph Kostrzewa, Buellton, CA (US); Peter Hall, Linköping (SE); Ognjan Hedberg, Linköping (SE); Tobias Höglund, Linköping (SE); Leonard S. Araki, Goleta, CA (US); Douglas R. Kraemer, Goleta, CA (US)

(73) Assignees: Flir Systems, Inc., Wilsonville, OR (US); Autoliv Development AB, Vargarda (SE)

( * ) Notice: Subject to any disclaimer, the term of this patent is extended or adjusted under 35 U.S.C. 154(b) by 1059 days.

(21) Appl. No.: 11/450,721

(22) Filed: Jun. 9, 2006

(51) Int. Cl.
*H04N 5/217* (2006.01)
*H04N 5/228* (2006.01)
*H04N 5/33* (2006.01)

(52) U.S. Cl. ............. 348/241; 348/222.1; 382/168

(58) Field of Classification Search ......... 348/370–371, 348/162–164, 241–251; 382/168–172, 162–164, 382/254–275
See application file for complete search history.

(56) References Cited

U.S. PATENT DOCUMENTS

| | | | |
|---|---|---|---|
| 7,202,463 B1 * | 4/2007 | Cox ..................... | 250/214 R |
| 7,333,144 B2 * | 2/2008 | Kubo .................... | 348/371 |
| 7,352,394 B1 * | 4/2008 | DeLuca et al. ........... | 348/241 |
| 7,414,667 B2 * | 8/2008 | Ichimasa ................ | 348/371 |
| 7,583,297 B2 * | 9/2009 | Yamada ................. | 348/224.1 |
| 2002/0150306 A1 * | 10/2002 | Baron ................... | 382/275 |
| 2006/0008171 A1 * | 1/2006 | Petschnigg et al. ........ | 382/254 |

* cited by examiner

*Primary Examiner*—Jason Chan
*Assistant Examiner*—Pritham Prabhakher
(74) *Attorney, Agent, or Firm*—Haynes and Boone, LLP

(57) ABSTRACT

Methods and systems for mitigating undesirable video flash in infrared camera systems are disclosed. A frame of video can be stored in a buffer and information related to the frame of video can be processed prior to displaying the video such that the processed information facilitates display of the video substantially without flashing. A display of a non-flashed frame can be frozen while a flash event would otherwise cause a flashed frame to be displayed. The shift in a histogram caused by a flash event or some portion thereof can be subtracted from pixels of an image. Thus, image quality can be substantially enhanced.

33 Claims, 7 Drawing Sheets

METHODS AND SYSTEMS FOR DETECTION AND MITIGATION OF IMAGE-FLASH IN INFRARED CAMERAS

TECHNICAL FIELD

The present invention relates generally to infrared cameras and, more particularly, to algorithmic methods and systems for processing infrared data, e.g., mitigating the undesirable effects of image flash, for infrared camera systems.

BACKGROUND

Infrared camera systems are well known and are used in many different applications. For example, infrared camera systems can be used on vehicles, including automobiles, to enhance viewing. Such infrared cameras can be particularly useful during periods of decreased visibility, such as dusk, dawn, and at night.

As those skilled in the art will appreciate, a flash, e.g., a whitened image that is displayed, may occur when there is an abrupt change in the temperature of at least a portion of a scene being imaged. A flash is displayed as one or more image frames that contain substantially more white (indicating heat) than desired. A flash can be predominantly white.

For example, a flash can occur when a raindrop or snowflake strikes or splashes against the lens of an infrared camera. Water is substantially non-transmissive in infrared and the raindrop or snowflake typically quickly heats up after it contacts the warm optical element.

Such flashing is undesirable because it can be distracting and annoying to one viewing the displayed image and may even prevent viewing of the intended image. That is, the display of a flash can prevent someone from seeing something in the display that should be seen. As a result, there is a need for one or more methods and/or systems that mitigate the occurrence of flashing in infrared camera systems.

SUMMARY

Systems and methods are disclosed herein to provide for the mitigation of undesirable flash in infrared camera systems. According to one embodiment of the present invention, flash can be mitigated by storing a frame of video in a buffer and processing information related to the frame of video prior to displaying the frame of video. The processed information facilitates the display of the frame of video substantially without flashing.

Processing the information related to the frame of video can comprise updating an intensity transform table for the stored frame of video. Updating the intensity transform table can comprise using a histogram for the stored frame of video to at least partially define the intensity transform table.

According to one embodiment of the present invention, flash can be mitigated by freezing a display of the last non-flashed frame during a period of time in which a flash event (such as a raindrop or snowflake striking or splashing against the optics of an infrared camera) would otherwise cause a flashed frame to be displayed. Freezing can be accomplished by holding the non-flashed frame in a video buffer and reading it out repeatedly without overwriting it with data from a subsequent frame.

Display of the non-flashed frame can be repeated for any desired amount of time or number of frames. Thus, the non-flashed frame can be stored for one frame, two frames, or more frames. Generally, the non-flashed frame will be stored for the amount of time or number of frames that is necessary to prevent a flash from being displayed. Thus, the non-flashed frame can be stored for the length of time that it takes to process an intensity transform table that substantially mitigates flash in one or more subsequent frames.

Recursive filtering of the intensity transform table can be disabled until the flash event has passed. By disabling recursive filtering, recovery of the infrared camera from a flash event can be accelerated.

According to one embodiment of the present invention, flash can be mitigated by subtracting all or some portion of a shift in a histogram caused by a flash event from pixels of an image. Subtracting at least a portion of a histogram shift from pixels of an image can comprise subtracting a portion of the histogram shift that is proportional to a shift in the mean of the histogram from pixels of the image. For example, subtracting at least a portion of a histogram shift from pixels of an image can comprise subtracting a mean of the histogram shift (mean-shift) from the pixels of the image. Subtracting at least a portion of a histogram shift from pixels of an image can comprise subtracting all of a histogram shift from every pixel of an image.

According to one embodiment of the present invention, flash can be detected (so as to facilitate mitigating of the flash, for example), by determining if a histogram has changed more than a predetermined amount and also determining if a number of pixels have changed more than a predetermined amount. By determining if both a histogram and a number of pixels have changed, more robust flash detection is provided.

Determining if a histogram has changed more than a predetermined amount can comprise determining if a mean of the histogram has changed more than a predetermined amount. For example, determining if a histogram has changed more than a predetermined amount can comprise determining if a mean of the histogram has changed an amount corresponding to more than ½° C.

Determining if a number of pixels have changed more than a predetermined amount can comprise determining if a predetermined percentage of the pixels of a frame have changed by an amount corresponding to more than a predetermined temperature. For example, determining if a number of pixels have changed more than a predetermined amount can comprise determining if 30% of the pixels of a frame have changed by an amount corresponding to more than ½° C.

One or more embodiments of the present invention provide one or more methods and systems that detect flash and/or mitigate the occurrence of flash in infrared camera systems, e.g., to mitigate the distraction and annoyance caused thereby. As those skilled in the art will appreciate, such flash may substantially decrease the utility and desirability of contemporary infrared systems.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
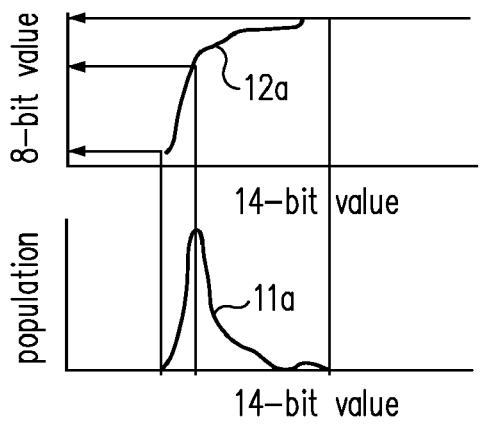
FIG. 1 shows a chart illustrating the use of an intensity transform table (as represented by a curve) to provide desired infrared image brightness and/or contrast and to convert m bit image data to n bit image data (where m>n) in accordance with an embodiment of the present invention, wherein the intensity transform table is appropriate for the histogram and an image displayed using the resulting n bit data does not contain a flash.

As discussed above, undesirable flash occurs in contemporary infrared camera systems when a raindrop or snowflake strikes the camera's lens, e.g., a surface through which an optical viewing path is formed. Water from the raindrop is quickly heated to a temperature, for example, where it becomes hot enough to overwhelm the camera system's automatic gain control (AGC) or is beyond its present setting or adjustment capability, resulting in the display of a predominately white frame or flash.

Contemporary infrared cameras can use an automatic gain control system wherein an intensity transform table is applied to imaged data so as to maintain the required range of the image data. This is done so that the range is suitable for further processing and/or display. Such an automatic gain control system can provide image enhancement (such as by controlling brightness and/or contrast of displayed images, for example) and can change the resolution of the image data (such as from 14 bit to 8 bit resolution, for example).

According to contemporary practice, the intensity transform table (ITT) applied to a current frame is based on data that may have occurred one or more frames earlier. There are several possible reasons for the latency. First, the intensity transform table based on the current frame cannot be updated until the histogram for the current frame is complete.

Second, even after the histogram for the current frame is collected, according to contemporary practice the processing cannot necessarily be completed in the small interval of time between the current frame and the next frame. Thus, according to contemporary practice, the processing spills over into the next frame, causing latency to increase by another frame.

Third, the intensity transform table is typically updated at some fraction of the frame rate. For example, the intensity transform table can be updated at 15 Hz instead of the 30 Hz frame rate commonly used in video systems. Such updating at a fraction of the frame rate causes latency to increase by one additional frame on every other frame.

Thus, when a raindrop or snowflake strikes the camera's lens, the histogram tends to change rapidly, whereas the latency in updating the intensity transform table does not allow it to change as rapidly. During the time that it takes the intensity transform table to update, the image data can be out of the desired range, i.e., can be too bright and/or have insufficient contrast. Thus, a flash may be displayed on the monitor.

While not a latency issue per se, according to contemporary practice recursive filtering is often applied to the intensity transform table. The use of such recursive filtering causes the recovery from a flash event to take many frames, even after the flash event is finished.

If the only source of latency is due to waiting for completion of the histogram, then introducing a frame buffer can substantially mitigate the problem. According to an embodiment of the present invention, a frame buffer is used to hold a frame of video data until the histogram for that frame is complete. In this manner, the frame can be displayed using an intensity transform table based on data from that frame, instead of the data from an earlier frame (which may not be appropriate for the current frame, such as due to flashing, for example).

Thus, according to an embodiment of the present invention, a frame buffer can be used to mitigate, e.g., eliminate or partially eliminate, undesirable flash. When a frame buffer is used, the problems due to the small time interval available for processing of the intensity transform table, updating of the intensity transform table at a fraction of the frame rate, and the use of recursive filtering, are still potential sources of flash. However, they can be substantially mitigated as the result of further embodiments of the present invention.

According to one or more embodiments of the present invention, signal flow is enhanced so as to better detect flash, such that detection occurs before the frame is displayed.

According to one or more embodiments of the present invention, there are two criteria (and three threshold values) that can be used to detect a flash event. A first criteria is that the mean of the histogram for a frame must change by a predetermined amount x. A second criterion is that a predetermined number y of pixels must change by a predetermined amount z. According to an exemplary embodiment of the present invention, the default values of x and z can be those values that correspond to a shift of approximately ½° Celsius of equivalent scene temperature change. The default value of y can be 30% of the array.

Using only the mean of the histogram is undesirably prone to false detections. For example, if some small but hot object moves into the field of view, the mean of the histogram can potentially shift above the threshold even though there is no flash event.

Conversely, using only a predetermined change in a predetermined number of pixels is also prone to false detections. A simple illustration of this can be provided by imaging a hot picket fence. If the fence shifts slightly in the field of view, a large number of individual pixels will suddenly change value significantly while the mean value of the array stays generally constant. Using both of the criteria together provides a robust method for the detection of flash events that reduces the incidence of false detections.

According to one embodiment of the present invention, the processes that take place in response to the detection of a flash substantially mitigate the display of flashing. Four examples of methods for such mitigation are discussed herein.

The first method for the mitigation of flash is a freeze frame method. According to this method, when a flash event is detected the current, non-flashed frame, is frozen (continually displayed) long enough for a new intensity transform table to be generated that is appropriate for the next frame to be displayed. The new intensity transform table will mitigate the effect of flashing in the display.

The second method addresses the problems caused by updating the intensity transform table at a fraction of the frame rate. This method comprises reassigning the priority of the intensity transform table update. For example, processing of the intensity transform table can be moved from the background to the foreground of the processor. This reduces the amount of time that a frozen image is displayed.

For example, when a flash is detected, then a currently displayed frame can be frozen until the next intensity transform table update. To shorten the number of frames that are frozen, the intensity transform table update can be commanded to take place as soon as possible rather than at the next regularly scheduled time.

The third method is to have the processor, for example, modify image data in a manner that mitigates the effects of flash. The processor has already computed the magnitude of the histogram shift (since that is one of the criteria for detecting a flash event in one embodiment of the present invention). Since the processor has this information, the processor can undo the shift (caused by the flash) by subtracting the shift, or some fraction thereof, from every pixel in the frame to be displayed.

For example, if the histogram's mean shifts by 100 counts, then subtracting 100 counts from every pixel will maintain the modified mean and hence tend to eliminate the flash. The result is that instead of a freeze, a live image is displayed at the same average brightness as the previous frame. The contrast may be reduced since the water droplet causing the flash may reduce the magnitude of the scene energy to be transmitted to the infrared sensor. However, there is little or no disturbing flash. This solution can be used instead of freezing the current or non-flashed frame.

A fourth method comprises temporarily disabling the recursive filter after a flash event. This can allow more rapid recovery when the intensity transform table updates.

According to one embodiment of the present invention, an algorithm looks for changes in the histogram that exceed a predetermined threshold (comparatively large changes that tend to necessitate the use of a new intensity transform table so as to maintain the desired range of the image data). Some exemplary criteria for detecting such changes are discussed herein.

The algorithm can freeze a previous good frame (a frame for which the image data is within the desired range of the camera system and thus does not cause a flash), while the intensity transform table is being updated. Typically, such freezing is only necessary for one or two frames, such that its impact upon a person viewing the display tends to be minimized.

Thus, when image data indicative of a flash occurs, then the algorithm re-displays the same previous, non-flashed, frame one or more times so as to give the automatic gain control system time to catch up. During this time, the intensity transform table is updated so as to be substantially more appropriate for the current image data. When a flash is detected, processing of the intensity transform table can be moved from the background to the foreground of a processor, so that it is performed more quickly. That is, such processing can be performed before other, less critical processing.

FIG. 1 shows a chart illustrating some aspects of an automatic gain control system for an infrared camera. The chart shows a histogram 11a that is representative of image data (intensity bins versus number of pixels or population within each intensity bin). The chart also shows an intensity transform table 12a (as represented by a curve) that can be applied to image data, so as to vary the range of the image data according to well known principles.

According to one embodiment of the present invention, m bit image data values of the infrared camera's image data are converted into corresponding n bit values (m>n) by intensity transform table 12a. Intensity transform table 12a can be a lookup table for which the m bit image data values are inputs and the corresponding n bit gray scale values are outputs.

Figure 2:
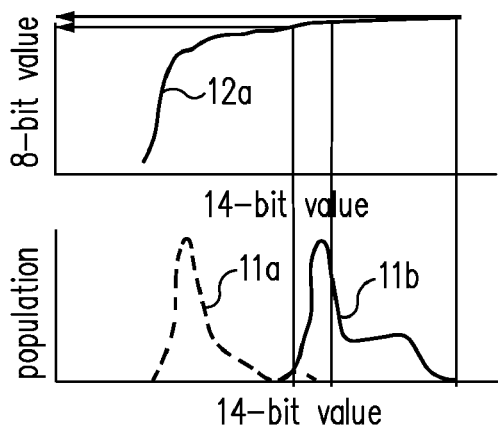
FIG. 2 shows a chart illustrating the use of an intensity transform table as in FIG. 1, wherein the histogram has shifted in position such that the intensity transform table is no longer appropriate for the histogram (the intensity transform table does not provide desired contrast and brightness, but rather results in a flash or substantially white frame)

FIG. 2 shows the chart of FIG. 1, wherein histogram 11a has moved to the right to become histogram 11b. Such shifting of histogram 11a can be caused by a change in the imaged scene's brightness, such as that caused by a raindrop or snowflake striking the camera lens.

At this point, intensity transform table 12a has not yet been updated so as to effect desired automatic gain control and thus maintain the image data within the desired range. Thus, intensity transform table 12a improperly converts m bit image data into n bit image data. As can be seen, histogram 11b has shifted such that intensity transform table 12a converts substantially all of any m bit image data into higher values (more white) of n bit data than is desired. This results in too much brightness and too little contrast. Thus, when intensity transform table 11a is applied to image data, the displayed result is a flash, or predominantly white screen.

Figure 3:
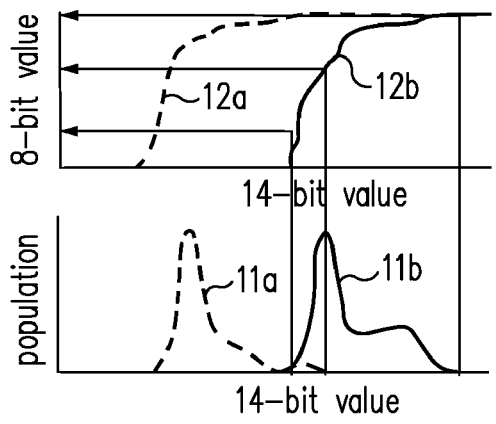
FIG. 3 shows a chart illustrating the use of an intensity transform table as in FIG. 2, wherein the intensity transform table has shifted so as to be appropriate for use with the shifted histogram of FIG. 2, causing the resulting 8 bit image to have desirable intensity and contrast so as not to contain a flash, in accordance with an embodiment of the present invention.

FIG. 3 shows the chart of FIG. 2 after intensity transform table 11a has been updated, so as to properly convert the 14 bit image data into 8 bit data. If this updating of the intensity transform table occurs while an earlier intensity transform table 12a is still being used to process image data and the image data has a substantially shifted histogram, then a flash results. In such instances, the intensity transform table is not updated fast enough to prevent the flash.

According to one embodiment of the present invention, the intensity transform table is updated, optionally on an expedited basis, when a shift in the histogram occurs, and this is accomplished while a previous, non-flashed, frame is being displayed. In this manner, the flash that results from the shift in the histogram is not displayed.

Figure 4:
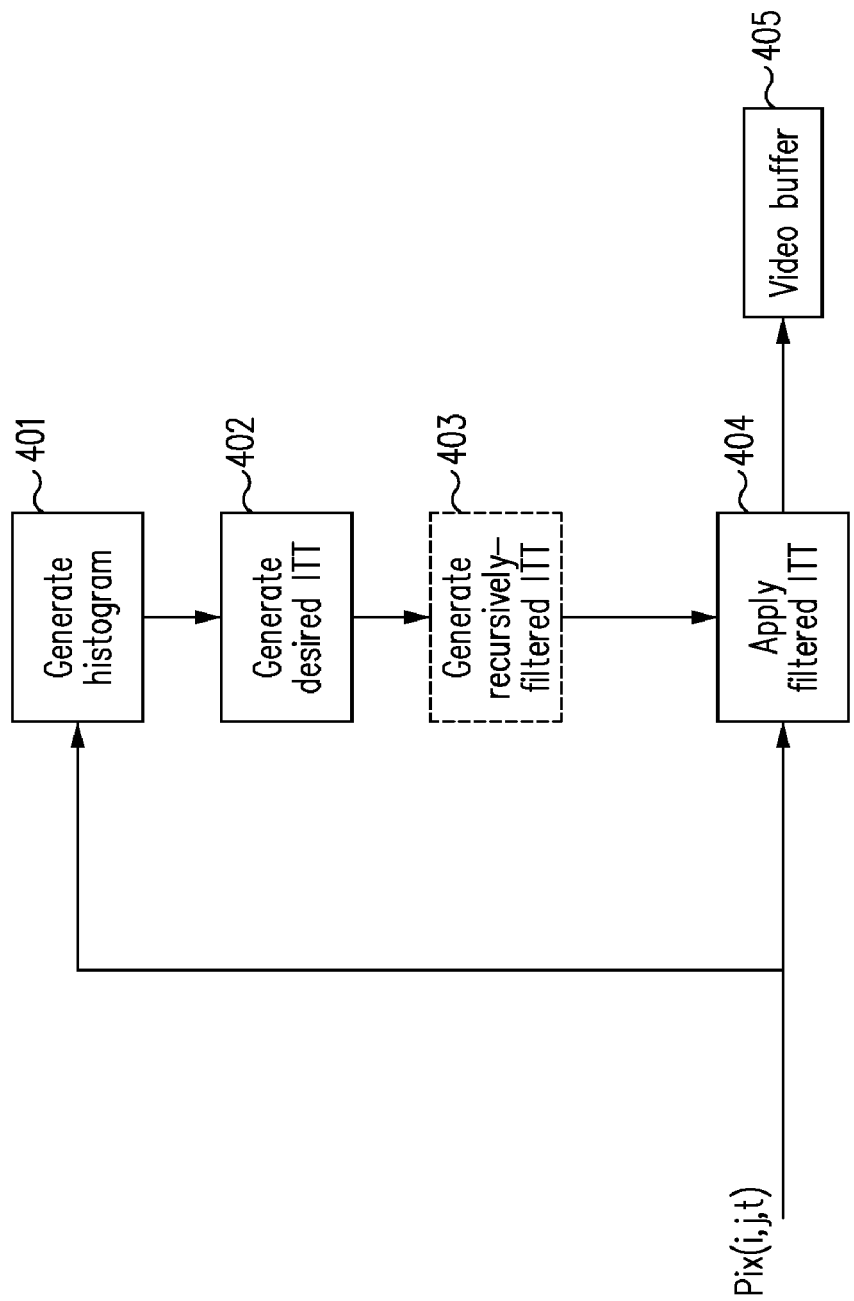
FIG. 4 shows a block diagram illustrating a portion of a signal pipeline for an infrared camera, wherein the signal is not corrected so as to inhibit the occurrence of flash.

FIG. 4 shows a block diagram illustrating a portion of a signal pipeline for an infrared camera. In this instance, the signal is not corrected so as to inhibit the occurrence of flash. Thus, a flash is displayed. The displayed flash can be annoying and distracting, as discussed above.

More particularly, a stream of video data Pix(i, j, t) includes data for individual pixels where i is the row of each pixel, j is the column of each pixel, and t is the frame of each pixel. The video data Pix(i, j, t) is provided to both a "generate histogram" circuit 401 and an "apply filtered ITT" circuit 404.

"Generate histogram" circuit 401 generates a histogram, such as from each frame of video data, and provides the histogram to a "generate desired ITT" circuit 402. "Generate desired ITT" circuit 402 generates an intensity transform table (ITT).

Optionally, the intensity transform table is provided to "generate recursively filtered ITT" circuit 403. As those skilled in the art will appreciate, a recursive filter can be applied to the intensity transform table so as to mitigate the undesirable effects of rapidly changing data in stream of video data Pix(i, j, t).

The intensity transform table, whether recursively filtered or not, can be provided to an "apply filtered ITT" circuit 404. "Apply filtered ITT" circuit 404 can apply the intensity transform table to stream of video data Pix(i, j, t).

However, the processes of generating the histogram, generating the desired intensity transform, and optionally recursively filtering the intensity transform table require time for processing. Thus, by the time an intensity transform table is ready to be applied to the stream of video data Pix(i, j, t), a subsequent frame of video data is being provided to "apply filtered ITT" circuit 404. That is, the frame of video data to which the intensity transform table is being applied occurred after the frame of data that was used to generate the intensity transform table.

This latency means that the intensity transform table is not always appropriate for the frame of video data. For example, an intensity transform table from a frame of video data that does not contain a flash event can be applied to a subsequent frame of video data that does contain a flash event. This can result in the undesirable display of flashing.

More particularly, when an intensity transform table for a frame of video data not having a flash event is applied to a frame of video data having a flash event, then the intensity transform table will tend to cause the display image to have an intensity and contrast that is not appropriate for the flash event, thus causing the undesirable effects of the flash event.

Figure 5:
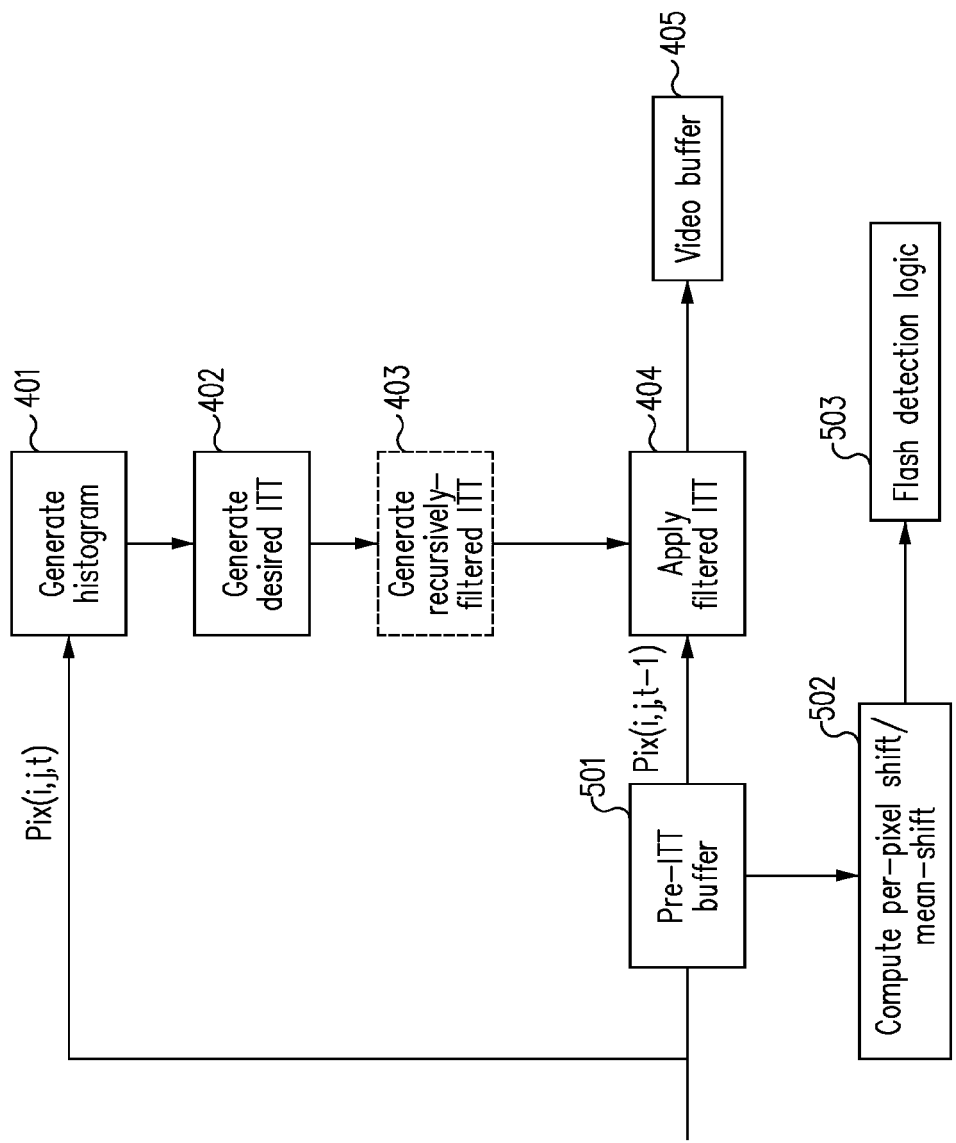
FIG. 5 shows a block diagram illustrating a portion of a signal pipeline for an infrared camera, wherein flash detection is performed so as to facilitate mitigation of flash, according to an embodiment of the present invention.

In order to mitigate the undesirable display of flashing, the signal pipeline of FIG. 5 shows a modification of the signal pipeline of FIG. 4 so as to facilitate flash detection and FIGS. 6-9 show further modifications of the signal pipeline so as to facilitate flash mitigation, as discussed in detail below.

FIG. 5 shows a block diagram illustrating a portion of a signal pipeline for an infrared camera, wherein flash detection is performed so as to facilitate mitigation of flash according to an embodiment of the present invention. More particularly, a pre-ITT buffer 501 has been added to store a frame of video stream Pix(i, j, t). Thus, a delayed video stream Pix(i, j, t−1) can be provided to "apply filtered ITT" circuit 404.

Pre-ITT buffer 501 provides the video data to a "compute per-pixel shift/mean-shift" circuit 502. This circuit determines the amount of shift of each pixel of a frame of video data, as well as the shift of the mean of the video data. This information can be used by a "flash detection logic" circuit 503 to determine whether or not a flash event is present in the video data, as described herein.

Applying delayed video stream Pix(i, j, t−1) to "apply filtered ITT" circuit 404 has the benefit of facilitating the application of an intensity transform table to the same frame of video that was used to generate the intensity transform table. Applying an intensity transform table to the same frame of video that was used to generate the intensity transform table has the potential to mitigate the display of flashing. For example, if the intensity transform table for a frame of video data having a flash event is applied to that same frame of video data, then the intensity transform table will tend to cause the display image to have an intensity and contrast that is appropriate for the flash event, thus mitigating the undesirable effects of the flash event.

Figure 6:
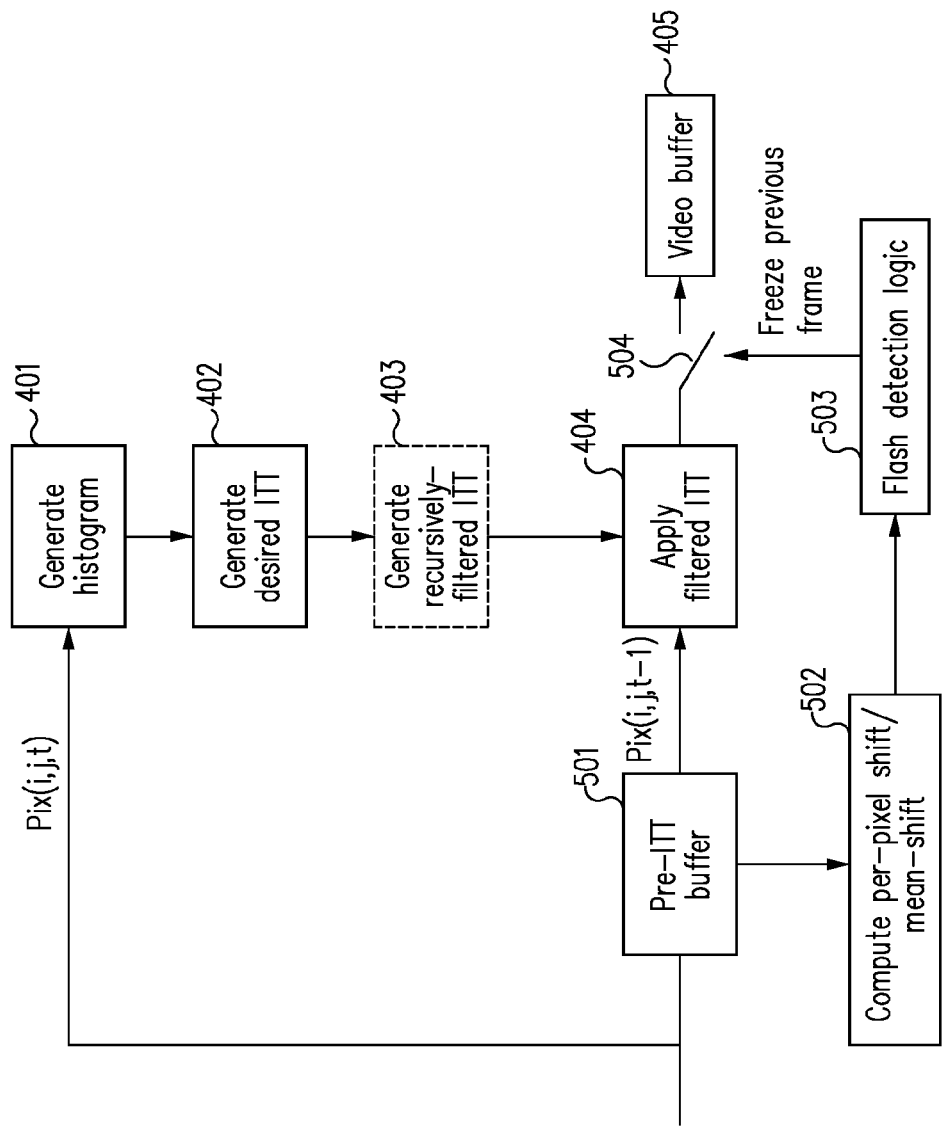
FIG. 6 shows a block diagram illustrating a portion of a signal pipeline for an infrared camera, wherein flash detection and a first flash mitigation strategy are performed according to an embodiment of the present invention.

FIG. 6 shows a block diagram illustrating a portion of a signal pipeline for an infrared camera, wherein flash detection and a first flash mitigation strategy are performed according to an embodiment of the present invention. More particularly, flash detection can be performed as described with respect to FIG. 5 and flash mitigation can be performed by using switch 504 to disconnect video buffer 405 from "apply filtered ITT" circuit 404 when a flash event is detected.

In other words, when a flash event is detected, then video buffer 405 is not updated by "apply filtered ITT" circuit 404 for one or more frames. This provides time for the flash event to subside and/or for the intensity transform table to be updated so as to be more appropriate for the frame of video data containing the flash event.

When switch 504 is positioned such that no new video data is provided to video buffer 405, then video buffer 405 continues to facilitate the display of the video information that is stored therein. That is, the same frame of video is re-displayed one or more times.

It is worthwhile to note that switch 504 does not necessarily have to be a physical switch, but rather indicates control of the writing of new video data to video buffer 405. Thus, new video data can continue to be provided to video buffer 405 without the new data actually being written thereto.

Switch 504 can re-apply video data from "apply filtered ITT" circuit 404 to video buffer 405 after the flash event has subsided and/or the intensity transform table has been updated so as to be more appropriate for the frame of video data containing the flash event. Switch 504 can be controlled by flash detection logic 503 such that when a flash event is present in the video data, then no new video data is applied to video buffer 405 and when no flash event is present in the video data, then new video data is applied to video buffer 405.

Figure 7:
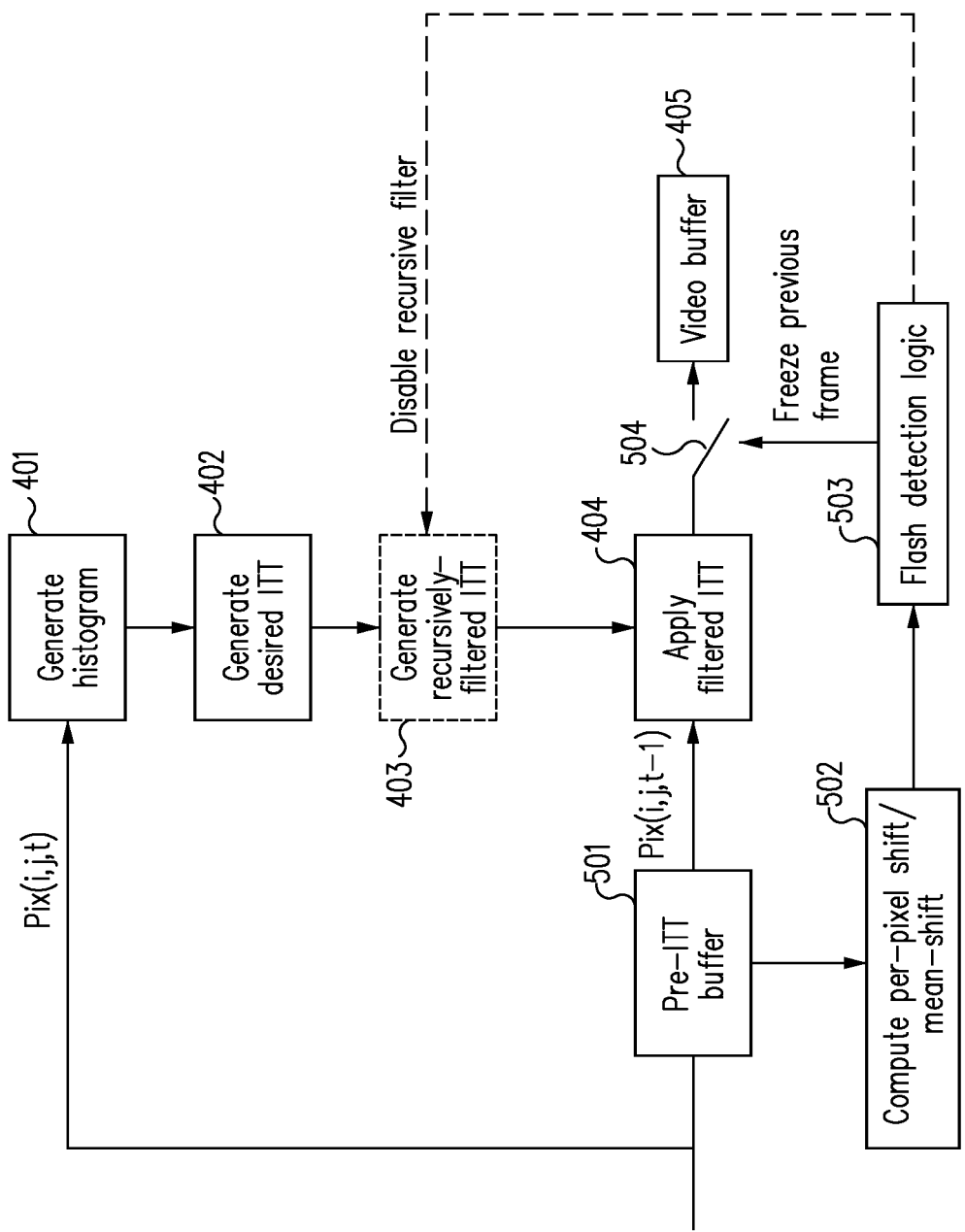
FIG. 7 shows a block diagram illustrating a portion of a signal pipeline for an infrared camera, wherein flash detection and a second flash mitigation strategy are performed according to an embodiment of the present invention.

FIG. 7 shows a block diagram illustrating a portion of a signal pipeline for an infrared camera, wherein flash detection and a second flash mitigation strategy are performed according to an embodiment of the present invention. Flash detection and mitigation can be performed as described with respect to FIG. 6 and flash mitigation can be further enhanced by disabling recursive filtering.

More particularly, flash detection logic can control "generate recursively-filtered ITT" circuit 403 such that when flash detection logic 503 detects a flash event, then it can disable recursive filtering.

By disabling recursive filtering, the time required to update the applied intensity transform table can be substantially reduced. That is, the effects of pre-flash video data that tend to linger following a flash event due to recursive filtering are substantially mitigated or eliminated, so that the effects of a flash event can better be represented in the intensity transform table.

Figure 8:
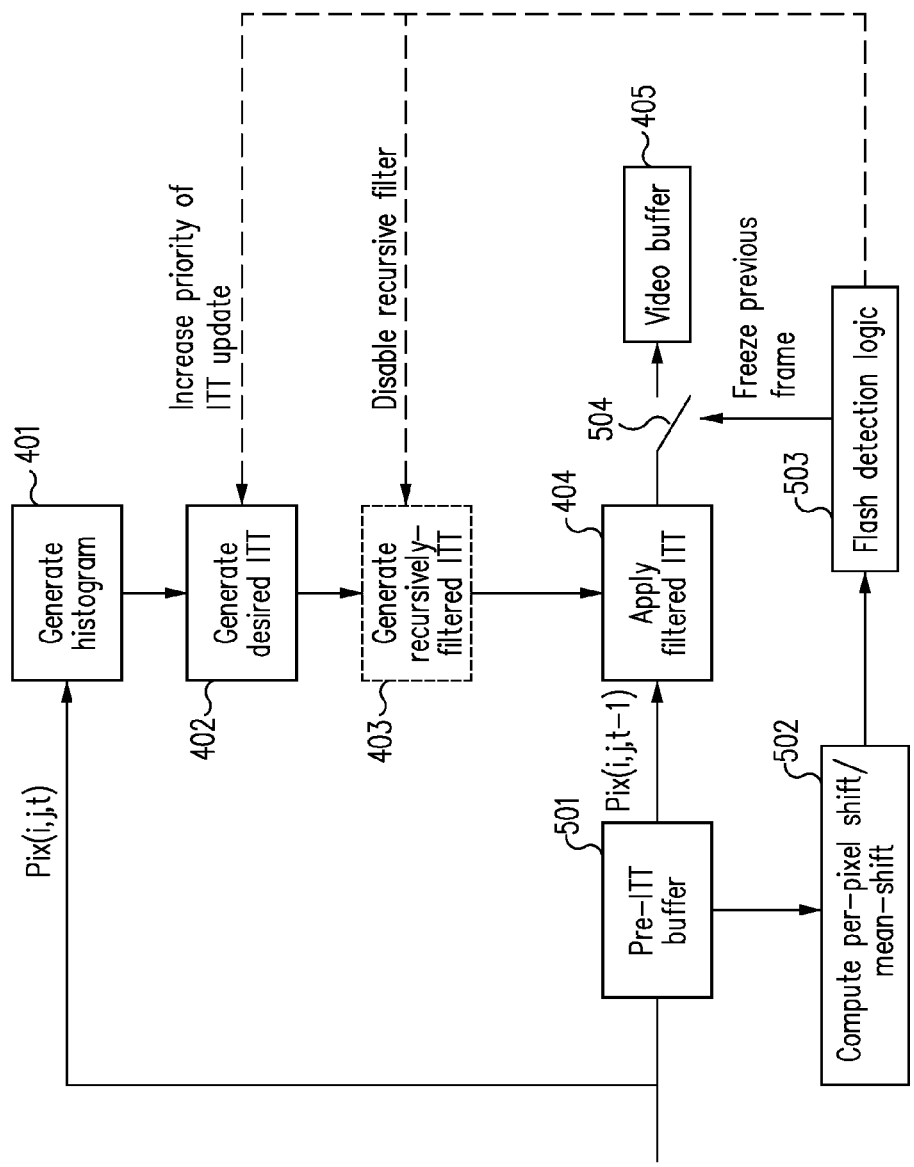
FIG. 8 shows a block diagram illustrating a portion of a signal pipeline for an infrared camera, wherein flash detection and a third flash mitigation strategy are performed according to an embodiment of the present invention.

FIG. 8 shows a block diagram illustrating a portion of a signal pipeline for an infrared camera, wherein flash detection and a third flash mitigation strategy are performed according to an embodiment of the present invention. Flash detection and mitigation can be performed as described with respect to FIG. 7 and flash mitigation can be further enhanced by increasing the priority of the intensity transform table update.

More particularly, flash detection logic can control the priority of "generate desired ITT" circuit 402 such that when flash detection logic 503 detects a flash event, then it can increase the priority of providing intensity transform updates. That is, when a flash event is detected, then the priority with which intensity transform table processing is done can be increased, e.g., intensity transform table process can be moved from the background to the foreground.

By increasing the priority of processing the intensity transform table, a new intensity transform table can be provided more quickly. Thus, fewer frames need to be frozen by re-displaying the contents of video buffer 405.

Figure 9:
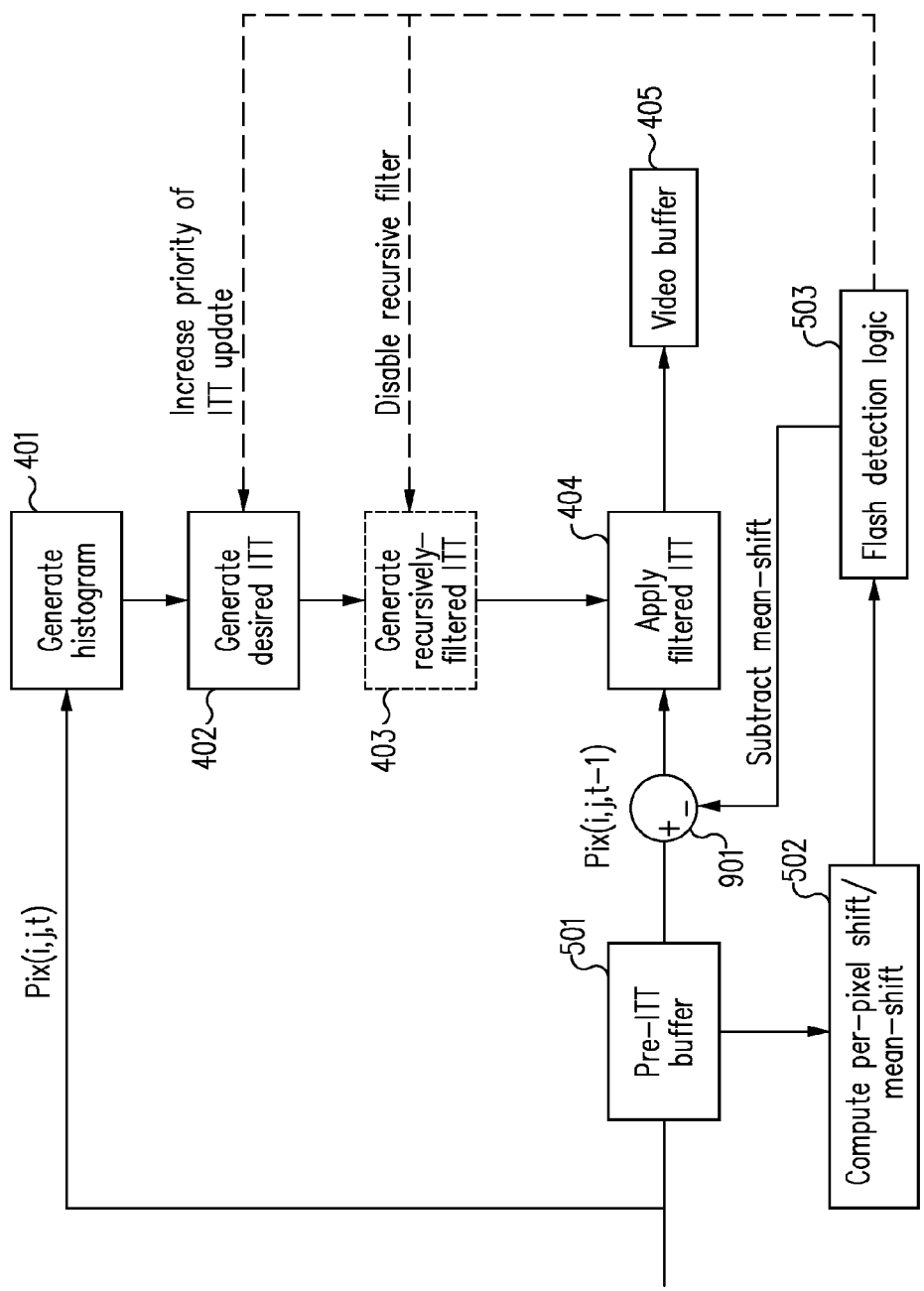
FIG. 9 shows a block diagram illustrating a portion of a signal pipeline for an infrared camera, wherein flash detection and a fourth flash mitigation strategy are performed according to an embodiment of the present invention.

FIG. 9 shows a block diagram illustrating a portion of a signal pipeline for an infrared camera, wherein flash detection and a fourth flash mitigation strategy are performed according to an embodiment of the present invention. Flash detection can be performed as described with respect to FIG. 8 and flash mitigation can be performed by subtracting a mean-shift or some other value (such as a portion of the mean shift) from the video data.

More particularly, after the mean-shift has been determined by "compute per-pixel shift/mean-shift" circuit 502, then flash detection logic 503 can cause the mean-shift or another value to be subtracted from the video data, such as by subtractor 901. Such subtraction can occur prior to applying the filtered intensity transform table to the video data, for example.

Various combinations of the methods for mitigating flash discussed herein may be used. For example, freezing a non-flashed image in video buffer 405 may be done while disabling recursive filtering, while increasing the priority of the intensity transform table update, or while both disabling recursive filtering and increasing the priority of the intensity transform table update.

Although FIGS. 5-9 show functions being performed by a plurality of apparently discrete circuits, it is worthwhile to appreciate that discrete circuits, dedicated processors, and/or general purpose processors, in any desired combination, can be used to perform the functions of FIGS. 5-9.

In one or more embodiments of the present invention, a field programmable gate array (FPGA) can be used, for example, to set a register so as to indicate to software that a freeze event is required (such as due to a substantial shift in a histogram). The use of a programmable gate array in this manner helps to facilitate the very tight timing that is required between detection of a flash and the start of the first frozen frame. Alternatively, an application specific integrated circuit (ASIC) or other type of general or specialized circuit or software may be used in place of the programmable gate array.

Software polls to the register can be performed asynchronously, for example, in accordance with an embodiment of the present invention. As a specific example, a set register can be used to trigger software to modify the intensity transform table filter coefficient.

Intensity transform table updating can be performed according to an on demand basis. For example, software can update the intensity transform table immediately after a flash detection. This will tend to reduce the number of frames that must be frozen.

The use of polling can be replaced with firmware latching, such as via the use of a firmware status bit. This will mitigate the critical timing requirements associated with the use of polling. Moreover, the software state machine of the infrared camera flash algorithm can be replaced by firmware that utilizes such a firmware status bit. The use of such firmware would tend to mitigate uncertainty regarding detection of a shift in the histogram on a current or previous frame.

The term lens as used herein can be defined as any infrared transparent structure through which infrared light passes for camera imaging. Thus, a lens can be a window, filter, or other covering and need not have refractive properties for infrared light.

The present invention provides methods and systems that mitigate the occurrence of flash in infrared camera systems. In this manner, the distraction and annoyance caused by flash is likewise mitigated and the quality of video imagery provided by the infrared camera system is substantially enhanced.

Although discussed herein as being an infrared camera system, those skilled in the art will appreciate that the flash algorithm of the present invention can alternatively be used with other types of camera systems as well. Indeed, one or more embodiments of the present invention can alternatively be used to mitigate the perception of defects in a wide variety of different types of data. Thus, discussion here as being an infrared camera system is by way of example only, and not by way of limitation.

Embodiments described above illustrate but do not limit the invention. It should also be understood that numerous modifications and variations are possible in accordance with the principles of the present invention. Accordingly, the scope of the invention is defined only by the following claims.

We claim:

1. A method for mitigating flash in an infrared camera system, the method comprising:
    storing a frame of video in a buffer;
    determining if a histogram has changed by more than a predetermined amount and if a number of pixels have changed by more than a predetermined amount for the frame comprising infrared image data;
    detecting if a flash event was captured in the frame based on the determining, wherein the flash event is due to an abrupt change in temperature of a scene captured in the video; and
    processing information related to the frame of video prior to displaying the frame of video in response to the detecting of a flash event, the processed information facilitating display of the frame of video substantially without flashing.

2. The method of claim 1, wherein processing information related to the frame of video comprises updating an intensity transform table for the stored frame of video, and wherein the method further comprises increasing a priority of updating the intensity transform table and/or disabling a recursive filter for processing frames of the video in response to the detecting of a flash event.

3. The method of claim 1, wherein processing information related to the frame of video comprises updating an intensity transform table using a histogram for the stored frame of video, and wherein the method further comprises freezing a display of a non-flashed frame for one or more frames in response to the detecting of a flash event.

4. A method for mitigating flash in an infrared camera system, the method comprising:
    determining if a histogram has changed by more than a predetermined amount and if a number of pixels have changed by more than a predetermined amount for a frame of infrared image video data;
    detecting if a flash event was captured in the frame based on the determining; and
    freezing a display of a non-flashed frame while a flash event would otherwise cause a flashed frame to be displayed in response to the detecting of a flash event.

5. The method of claim 4, wherein freezing a display of a non-flashed frame comprises storing the non-flashed frame in a buffer for a duration of one frame or more.

6. The method of claim 5, wherein the method further comprises increasing a priority of updating an intensity transform table associated with frames of the infrared image video data in response to the detecting of a flash event.

7. The method of claim 5, wherein the method further comprises disabling a recursive filter for processing frames of the infrared image video data in response to the detecting of a flash event.

8. The method of claim 4, wherein freezing a display of a non-flashed frame comprises freezing the display of the non-flashed frame after a flash has been detected, and wherein the method further comprises increasing a priority of updating the intensity transform table associated with frames of the infrared image video data and disabling a recursive filter associated with processing frames of the infrared image video data in response to the detecting of a flash event.

9. The method of claim 4, wherein the flash event is due to an abrupt change in temperature of a scene captured in the infrared image video data.

10. The method of claim 9, wherein determining if a histogram has changed more than a predetermined amount comprises determining if a mean of the histogram has changed more than a predetermined amount.

11. The method of claim 9, wherein determining if a histogram has changed more than a predetermined amount comprises determining if a mean of the histogram has changed an amount corresponding to more than $\frac{1}{2}°$ C.

12. The method of claim 9, wherein determining if a number of pixels have changed more than a predetermined amount comprises determining if a predetermined percentage of the pixels of a frame have changed by an amount corresponding to more than a predetermined temperature.

13. The method of claim 9, wherein determining if a number of pixels have changed more than a predetermined amount comprises determining if 30% of the pixels of a frame have changed by an amount corresponding to more than $\frac{1}{2}°$ C.

14. The method of claim 4, further comprising disabling recursive filtering until the flash event has passed, and wherein determining if a histogram has changed more than a predetermined amount comprises determining if a mean of the histogram has changed more than a predetermined amount.

15. The method of claim 4, further comprising increasing a priority of performing an intensity transform table update, and wherein determining if a histogram has changed more than a predetermined amount comprises determining if a mean of the histogram has changed more than a predetermined amount.

16. A method for mitigating flash in an infrared camera system, the method comprising:
    storing a frame of infrared image video data in a buffer;
    determining if a histogram has changed by more than a predetermined amount and if a number of pixels have changed by more than a predetermined amount for the frame;
    detecting if a flash event was captured in the frame based on the determining; and
    subtracting a shift in a histogram caused by a flash event or some portion thereof from the frame of infrared image video data in response to the detecting of a flash event.

17. The method as recited in claim 16, wherein subtracting at least a portion of a histogram shift from pixels of an image comprises subtracting a portion of the histogram shift that is proportional to a shift in the mean of the histogram from pixels of the image, and wherein the flash event is due to an abrupt change in temperature of a scene captured in the infrared image video data.

18. The method as recited in claim 16, wherein subtracting at least a portion of a histogram shift from pixels of an image comprises subtracting a mean of the histogram shift from the pixels of the image.

19. The method as recited in claim 16, wherein subtracting at least a portion of a histogram shift from pixels of an image comprises subtracting all of a histogram shift from pixels of an image.

20. The method as recited in claim 16, wherein subtracting at least a portion of a histogram shift from pixels of an image comprises subtracting at least a portion of a histogram shift from every pixel of an image, and wherein the method further comprises increasing a priority of updating an intensity transform table and/or disabling a recursive filter for processing frames of the infrared image video data in response to the detecting of a flash event.

21. A method for detecting a flash event in an infrared camera system, the method comprising:
    storing a frame of infrared image video data in a buffer;
    determining if a histogram has changed by more than a predetermined amount and if a number of pixels have changed by more than a predetermined amount for the frame of infrared image video data;
    detecting if a flash event was captured in the frame based on the determining; and
    modifying a processing of the infrared image video data, in response to the detecting of a flash event, by disabling a recursive filter used to generate an intensity transform table applied to the infrared image video data and/or increasing a priority level of updating the intensity transform table that is applied to the infrared image video data.

22. The method of claim 21, wherein determining if a histogram has changed more than a predetermined amount comprises determining if a mean of the histogram has changed more than a predetermined amount, and wherein the flash event is due to an abrupt change in temperature of a scene captured in the infrared image video data.

23. The method of claim 21, wherein determining if a histogram has changed more than a predetermined amount comprises determining if a mean of the histogram has changed an amount corresponding to more than $\frac{1}{2}°$ C.

24. The method of claim 21, wherein determining if a number of pixels have changed more than a predetermined amount comprises determining if a predetermined percentage of the pixels of a frame have changed by an amount corresponding to more than a predetermined temperature, and wherein the method further comprises freezing a display of a non-flashed frame while a flash event would otherwise cause a flashed frame to be displayed in response to the detecting of a flash event.

25. The method of claim 21, wherein determining if a number of pixels have changed more than a predetermined amount comprises determining if 30% of the pixels of a frame have changed by an amount corresponding to more than $\frac{1}{2}°$ C.

26. A system for mitigating infrared camera flash, the system comprising:
    means for storing a frame of infrared image video data;
    means for determining if a flash event is present in the frame based on whether a histogram has changed by more than a predetermined amount and whether a number of pixels have changed by more than a predetermined amount for the frame of infrared image video data; and
    means for processing information related to the frame of infrared image video data prior to displaying the frame of infrared image video data, in response to a flash event detected by the determining means, such that the processing facilitates display of the frame of video substantially without flashing.

27. The system of claim 26, wherein the determining means is further adapted to control a freezing of a display of a non-flashed frame to prevent a display of a flash event in response to a flash event detected by the determining means.

28. The system of claim 26, wherein the processing means, in response to a flash event detected by the determining means, is adapted to disable a recursive filter used to generate an intensity transform table applied to the infrared image video data and/or increase a priority level of updating the intensity transform table that is applied to the infrared image video data.

29. A system for mitigating infrared camera flash, the system comprising:
- means for storing a frame of infrared image video data;
- means for determining if a flash event is present in the frame based on whether a histogram has changed by more than a predetermined amount and whether a number of pixels have changed by more than a predetermined amount for the frame of infrared image video data; and
- means for subtracting at least a portion of a shift in the histogram caused by a flash event from the frame of infrared image video data in response to a flash event detected by the determining means.

30. The system of claim 29, further comprising means for processing the infrared image video data, wherein the processing means is adapted to disable a recursive filter used to generate an intensity transform table applied to the infrared image video data and/or increase a priority level of updating the intensity transform table that is applied to the infrared image video data in response to a flash event detected by the determining means.

31. A system for detecting a flash event in an infrared camera system, the system comprising:
- a pre-buffer adapted to store a frame of infrared image video data;
- flash detection logic adapted to detect if a flash event is present in the frame based on whether a histogram has changed by more than a predetermined amount and whether a number of pixels have changed by more than a predetermined amount for the frame of infrared image video data; and
- intensity transform table generation logic adapted to generate intensity transform tables to apply to the infrared image video data prior to displaying the infrared image video data such that, in response to a flash event detected by the flash detection logic, the infrared image video data is modified to prevent substantially a display of the flash event.

32. The system of claim 31, wherein the flash detection logic is further adapted to control a freezing of a display of a non-flashed frame to prevent a display of a flash event in response to a flash event detected by the flash detection logic.

33. The system of claim 32, wherein the intensity transform table generation logic is adapted to disable a recursive filter used to generate the intensity transform tables applied to the infrared image video data and/or increase a priority level of updating the intensity transform tables that are applied to the infrared image video data in response to a flash event detected by the flash detection logic.

* * * * *